Aug. 6, 1968   J. K. SHANNON   3,396,362
TERMINAL CLAMP
Filed Oct. 3, 1966

INVENTOR.
JOHN K. SHANNON

BY *Dominik, Stein & Knechtel*

ATTORNEYS 3,396,362
TERMINAL CLAMP
John K. Shannon, Kenosha, Wis., assignor to Quick Cable Corporation, Racine, Wis., a corporation of Wisconsin
Continuation-in-part of application Ser. No. 566,875, July 21, 1966. This application Oct. 3, 1966, Ser. No. 583,619
5 Claims. (Cl. 339—227)

ABSTRACT OF THE DISCLOSURE

A lead battery terminal clamp which has a reinforcement ring and internally threaded tube which is preferably of steel, brass or another material having similar electrical and mechanical strength imbedded in it. One end of the threaded tube is open to threadedly receive a compression nut for connecting a battery cable to the clamp. The threaded tube being fabricated of steel or brass has sufficient strength to withstand the force exerted when the compression nut is screwed into it. It also improves the electrical conductivity from the battery post to the battery cable. The threaded tube also is preferably fixedly secured to the reinforcement ring to prevent the tube from being rotated when the compression nut is screwed into it.

The lead is preferably cast about the threaded tube and the reinforcement ring and, during casting, the lead is extended or overlapped over the edge of the periphery of the opening of the threaded tube so that the lead is mechanically secured to the tube. The lead which extends over the edge of the periphery of the opening of the tube also serves as a seal against corrosive acid when the compression nut is screwed tight against it.

---

This application is a continuation-in-part application of U.S. patent application, Ser. No. 566,875, filed July 21, 1966.

This invention relates to terminal clamps, and in particular, to battery terminal clamps.

Battery terminal clamps have been affixed to battery cables in numerous different ways, however, in recent years this connection has been found to be most easily made and most effectively made by using a compression nut which is adapted to close upon the battery cable when it is secured into a threaded hole in the battery terminal clamp. A compression nut which is particularly adapted for use in connecting battery cables to battery terminal clamps and the like is disclosed in U.S. Patent 3,205,472, issued Sept. 7, 1965.

Battery terminal clamps are presently being fabricated of brass and bronze because these materials have good electrical properties and have the strength to withstand the force exerted when the compression nut is screwed into the hole formed in the battery terminal clamp. Furthermore, these materials are also fairly resistant to the acid normally present in the operation of most storage batteries.

Lead has much better resistance to acid than brass or bronze, and also has satisfactory electrical properties. However, a reinforcement ring generally has to be embedded in a battery terminal clamp fabricated of lead to give it better mechanical strength when it is drawn tight against a battery post. Attempts have been made to connect battery cables to battery terminal clamps fabricated of lead, however, the compression nut when screwed into the threaded hole formed therein fails to close on the cable with sufficient force to hold the cable securely. Also, the compression nut galls the threads formed in the lead battery terminal, rendering them useless.

Accordingly, it is an object of the present invention to provide improved terminal clamps, and in particular, battery terminal clamps.

Another object is to provide battery terminal clamps of lead having means integrally formed therewith to strengthen them to withstand the force exerted when a compression nut is screwed within the aperture formed therein, for connecting a battery cable thereto. In this respect, it is further contemplated that the same means eliminate the problem of galling the threads within the compression nut receiving aperture.

Still another object is to provide a battery terminal clamp having good mechanical strength so that it can be drawn tightly against a battery post.

A still further object is to provide a lead battery terminal clamp constructed in a fashion as to provide a seal between the end of the clamp and the end of the compression nut when the latter is threadedly secured therein so that the acid normally present in the operation of most storage batteries is prevented from deleteriously affecting the battery cable.

Other objects of the invention will in part be obvious and will in part appear hereinafter.

The above objectives are accomplished with a lead battery terminal clamp which has a reinforcement ring and an internally threaded tube which is preferably of steel, brass or another material having similar electrical and mechanical strength imbedded in it. One end of the threaded tube is open to threadedly receive a compression nut for connecting a battery cable to the clamp. The threaded tube being fabricated of steel or brass has sufficient strength to withstand the force exerted when the compression nut is screwed into it. It also improves the electrical conductivity from the battery post to the battery cable. The threaded tube also is preferably fixedly secured to the reinforcement ring to prevent the tube from being rotated when the compression nut is screwed into it.

The lead is preferably cast about the threaded tube and the reinforcement ring and, during casting, the lead is extended or overlapped over the edge of the periphery of the opening of the threaded tube so that the lead is mechanically secured to the tube. The lead which extends over the edge of the periphery of the opening of the tube also serves as a seal against corrosive acid when the compression nut is secured tight against it.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
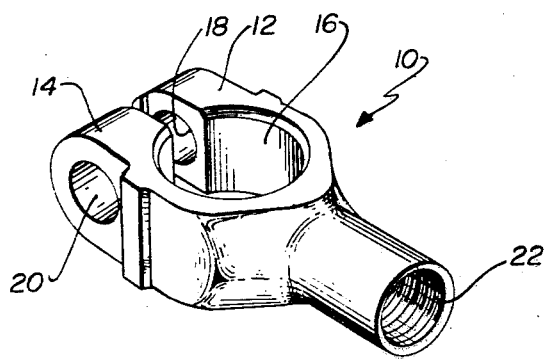
FIG. 1 is a perspective view of a lead battery terminal clamp, illustrative of the present invention.

Referring now to the drawing, in FIG. 1 there is illustrated a battery terminal clamp 10 exemplary of the invention which is fabricated of lead and which is preferably cast. The clamp 10 has a pair of jaws 12 and 14 which form generally circular battery terminal aperture 16 therebetween. The ends of the jaws 12 and 14 are in spaced relation and have apertures 18 and 20 formed therein, respectively, for receiving fastening means such as a threaded nut and bolt for tightening the jaws 12 and 14 about a battery terminal post, in the well-known manner. A threaded aperture 22 is formed in the opposite end of the clamp 10, for receiving a compression nut for connecting a battery cable to the clamp, generally in the manner taught by the above-mentioned patent, 3,205,472.

Figure 2:
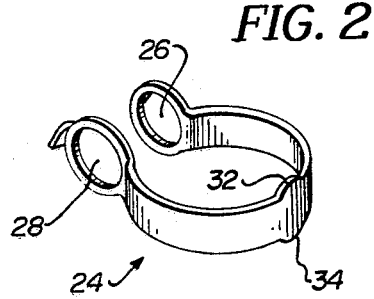
FIG. 2 is a perspective view of the reinforcement ring imbedded therein.

As indicated above, a reinforcement ring 24 of the type illustrated in FIG. 2 is imbedded in the clamp 10 in the portion thereof forming the jaws 12 and 14 when it is casted to give the clamp better mechanical strength when it is drawn tight against a battery terminal post. The reinforcement ring 24 generally corresponds to the shape of the jaws 12 and 14 of the clamp 10, being substantially semi-circular in shape and having apertures 26 and 28 formed therein correspondingly aligned with the apertures 18 and 20 formed in the jaws 12 and 14. The reinforcement ring 24 can be fabricated of steel, brass, or other similar material having sufficient flexibility and mechanical strength to effect a tight clamp about a battery terminal post.

Figure 3:
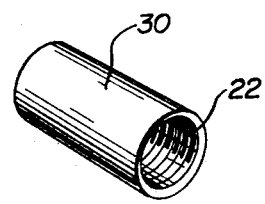
FIG. 3 is a perspective view of the internally threaded tube or sleeve imbedded therein.

An internally threaded tube or sleeve 30 of the type illustrated in FIG. 3 is also imbedded in the clamp 10 during casting which tube forms the compression nut receiving aperture 22 of the clamp. The sleeve 30 is fabricated of steel, brass or other material having similar electrical and mechanical properties so that the compression nut will close on the battery cable with sufficient force to securely hold the cable therein when the compression nut is threaded into the aperture 22. The sleeve 30 being fabricated of steel or brass also prevents the compression nut from galling the threads within the aperture 22 so that the compression nut can be threaded tightly therein.

Figure 5:
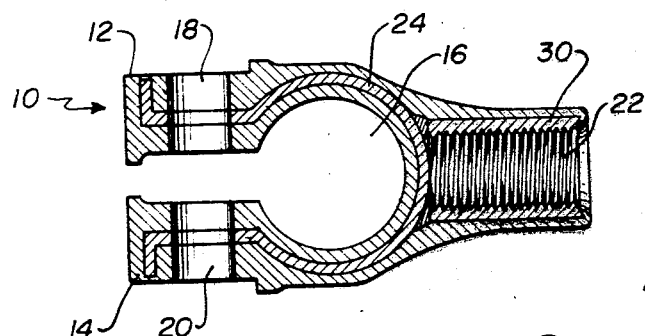
FIG. 5 is a sectional view, taken along lines 5—5 of FIG. 1.
Figure 4:
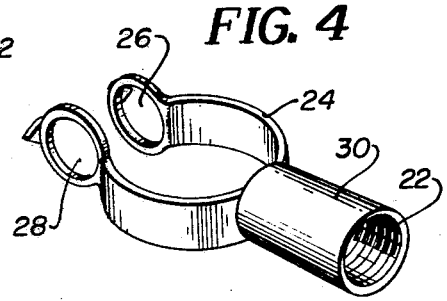
FIG. 4 is a perspective view illustrating the preferred construction, with the internally threaded tube or sleeve fixedly secured to the reinforcement ring.
Figure 6:
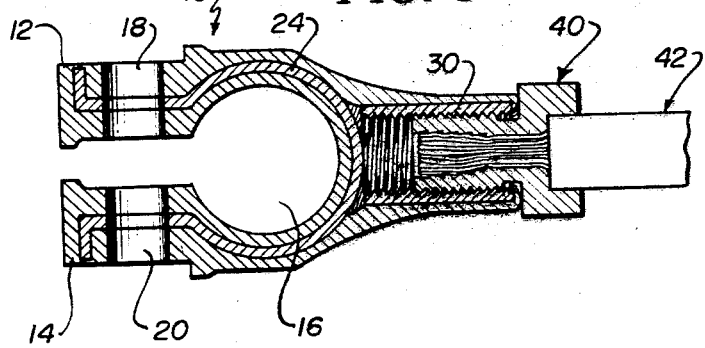
FIG. 6 is a similar sectional view, further illustrating the manner in which a compression nut is threadedly received within the tube or sleeve imbedded within the battery terminal clamp and the seal effected between the clamp and the compression nut.

The sleeve 30 is also preferably fixedly secured to the reinforcement ring 24 to prevent it from rotating when the compression nut is threaded into it. Accordingly, the replacement ring 24 and the sleeve 30 can be formed as an integral unit or, alternatively, the sleeve 30 can be welded or affixed in a similar manner to the reinforcement ring 24. If formed as separate units, the reinforcement ring is preferably formed with a pair of circular tabs 32 and 34 in diametrically opposed positions and having a diameter which corresponds to the diameter of the sleeve 30. When constructed in this fasion, a weld or the like can be provided about the entire peripheral edge of the sleeve 30, to provide a better mechanical connection between the sleeve and the reinforcement ring. When assembled in the described fashion or as an integral unit, the reinforcement ring and the sleeve are placed in an appropriate mold and lead cast about them to form the clamp 10. As can be best seen in FIG. 5, during the casting of the clamp 10 the lead cast around the outside of the sleeve 30 is extended or lapped over the edge of the periphery of the opening of the sleve so that the lead is mechanically secured to the sleeve. The lead, extending over the edge of the sleeve, serves as a seal against corrosive acid when a compression nut 40 is threaded into the sleeve, as illustrated in FIG. 6. It can be seen that a good seal is provided since the lead is relatively soft and will generally spread to effect a good contact with the compression nut as the compression nut is threaded tightly into the sleeve 30. Corrosive acid and the like is therefore prevented from attacking and having a deleterious effect upon the battery cable 42 secured within the compression nut.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A lead terminal clamp having embedded therein a substantially U-shaped re-enforcement ring having a body portion adapted to fit about a post-like member and a pair of arms each having an aperture formed at the end thereof for receiving fastening means for fixedly securing said clamp to a post-like member; and a tubular sleeve having internal threads therein adapted to receive threaded fastening means for fixedly securing a cable to said clamp, means fixedly securing one end of said sleeve to said ring to prevent said sleeve from rotating when fastening means are threaded therein, lead being cast about said sleeve so as to overlap the periphery of the opposite open end thereof to mechanically join said lead to said sleeve and to function as a seal between said opposite end of said sleeve and fastening means threadedly received therein.

2. The terminal clamp of claim 1 wherein said ring further includes a pair of semi-circular shaped tabs in diagrammatically opposed positions thereon forming a portion having a diameter corresponding to the diameter of said sleeve, whereby better mechanical connection can be made at said portion between said sleeve and said ring, by welding them together.

3. The terminal clamp of claim 1 wherein said ring and said sleeve are formed as a single integral unit.

4. The terminal clamp of claim 1 wherein said sleeve is formed of brass.

5. The terminal clamp of claim 1 wherein said sleeve is formed of steel.

References Cited

UNITED STATES PATENTS

| | | | |
|---|---|---|---|
| 1,756,445 | 4/1930 | Walde | 339—230 |
| 1,808,648 | 6/1931 | Fisher | 339—225 X |
| 2,142,759 | 1/1939 | Plachy | 339—227 |
| 2,531,309 | 11/1950 | Thomas | 339—227 |
| 2,618,675 | 11/1952 | Lallmang | 339—227 X |
| 2,713,155 | 7/1955 | Anderson | 339—227 |
| 2,789,274 | 4/1957 | Zam | 339—226 X |
| 3,193,796 | 7/1965 | Spangler | 339—227 |
| 3,205,472 | 9/1965 | Shannon | 339—232 |

MARVIN A. CHAMPION, *Primary Examiner.*

PERRY TEITELBAUM, *Assistant Examiner.*